United States Patent
Karidi (10) Patent No.: US 6,222,641 B1
(45) Date of Patent: Apr. 24, 2001

(54) METHOD AND APPARATUS FOR IMAGE DESCREENING

(75) Inventor: Ron J. Karidi, Menlo Park, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/108,270

(22) Filed: Jul. 1, 1998

(51) Int. Cl.$^7$ ....................................................... H04N 1/40
(52) U.S. Cl. ............................................. 358/1.9; 382/237
(58) Field of Search ............................ 358/1.9, 534–536, 358/456–459; 382/237

(56) References Cited

U.S. PATENT DOCUMENTS

| | | | |
|---|---|---|---|
| 4,193,096 | 3/1980 | Stoffel | 358/260 |
| 4,630,125 | 12/1986 | Roetling | 358/280 |
| 4,941,185 | * 7/1990 | Reed | 382/41 |
| 5,239,390 | 8/1993 | Tai | 358/458 |
| 5,327,257 | * 7/1994 | Hrytzak et al. | 358/447 |
| 5,333,064 | * 7/1994 | Seidner et al. | 358/456 |
| 5,384,648 | 1/1995 | Seidner et al. | 358/534 |
| 5,462,841 | * 10/1995 | Carleer | 430/396 |

FOREIGN PATENT DOCUMENTS

| | | | |
|---|---|---|---|
| 0041400B1 | 6/1984 | (EP) | H04N/1/38 |
| 0301786A1 | 2/1989 | (EP) | H04N/1/40 |
| 0511754A2 | 11/1992 | (EP) | H04N/1/40 |
| 0581415A2 | 2/1994 | (EP) | H04N/1/40 |
| 0622949A1 | 11/1994 | (EP) | H04N/1/40 |
| 0648040A2 | 4/1995 | (EP) | H04N/1/407 |
| 098004/2 | 2/1997 | (IL) | . |

* cited by examiner

Primary Examiner—Thomas D. Lee
Assistant Examiner—Stephen Brinich
(74) Attorney, Agent, or Firm—Michael A. Glenn (57) ABSTRACT

An image descreening process first smoothes the image, where smoothing is accomplished by applying a convolution with a low pass filter (LPF) kernel, which is a parameter to the descreening function. Using the smoothed image, a determination is made for each pixel for which pixels around it participate in the modified filter. For a current pixel, a window is considered having the size of the LPF kernel, with the current pixel at the center. A threshold T1 which is given as a parameter, is used to mark the pixels in the current window. Considering a pixel in the window, if for all color components the difference between this pixel value to the center pixel value is less than T1 in absolute value the pixel is marked with a 1. Otherwise, the pixel is marked with a 0. Finally, an adaptive version of the LPF is applied. If the number of pixels marked with a 1 in the window is less than a third of the kernel size, the original pixel value is restored. Additionally, for a color component for which there is a small change in values within the original (non-smoothed) window (i.e. the difference between the maximal value to the minimal value in this component is less than another threshold T2), the value of this color component is restored. If these conditions do not hold, a new value for each component is determined. To be the convolution of the original window, the LPF kernel is masked with the 0/1 markings from the second step. That is, the modified convolution uses an adaptive kernel which is identical to the LPF kernel in the locations marked with one, but has zero entries in the locations marked with zero.

22 Claims, 7 Drawing Sheets

METHOD AND APPARATUS FOR IMAGE DESCREENING

BACKGROUND OF THE INVENTION

1. Technical Field

The invention relates to image processing. More particularly, the invention relates to the descreening of halftoned images.

2. Description of the Prior Art

Halftone techniques have long been used to produce color images using a small number of inks and a restricted set of densities (typically 100%/0%, or ink/no ink). In digital imaging halftoning usually involves a threshold array, which is tiled to cover the whole page, or a dynamic error-diffusion procedure that averages the errors due to the device limits throughout the page.

When such images (that were originally printed using a halftone technique, either digital or analog), are digitally captured by a scanning device, it is often desirable to restore the original color intensities (or ink densities) and obtain a contone equivalent of the halftoned image. This process is often referred to as descreening because it removes the screen that was applied while halftoning. Failure to remove the low frequencies that were introduced through the halftoning results in artifacts when the scanned image is either displayed or reproduced in print.

Various descreening approaches have been described in the art. See, for example, J. Stoffel, Half Tome Encoder/Decoder, U.S. Pat. No. 4,193,096 (Mar. 11, 1980); P. Roetling, Unscreening of Stored Digital Halftone Images, U.S. Pat. No. 4,630,125 (Dec. 16, 1986); H.-T. Tai, Image Processing Method To Remove Halftone Screens, U.S. Pat. No. 5,239,390 (Aug. 24, 1993); D. Seidner, D. Eylon, Apparatus and Method For Descreening, U.S. Pat. No. 5,384,648 (Jan. 24, 1995); P. Lavelle, J. Stoffel, Multi-Resolution Image Signal Processing Apparatus and Method, European Patent No. 041400 (Jun. 6, 1984); R. Eschbach, Image-Dependent Exposure Enhancement, European Patent No 648040 (Nov. 2, 1995); Z. Xie, M. Rodriguez, Electronic High-Fidelity Screenless Conversion System and Method Using A Separate Filter, European Patent No. 581415 (Feb. 23, 1994); and P. Stansfield, A. Reed, Image Processing, European Patent Application No. 301786 (Feb. 1, 1989).

Unfortunately, such prior art techniques are either concerned with such issues as compression/decompression or descreening only in circumstances where the actual screen pattern is known prior to descreening.

It would be advantageous to provide an improved descreening technique. It would be further advantageous to provide an improved technique for descreening halftone images, where the halftone screen pattern is not known prior to descreening.

SUMMARY OF THE INVENTION

The invention provides a descreening technique that descreens halftone image information without prior knowledge of the halftone screen that was applied to the image. The preferred embodiment of the invention provides a descreening process that comprises the following steps (independent of resolution):

Smooth the image, where smoothing is accomplished by applying a convolution with a low pass filter (LPF) kernel, (the kernel size typically depends on the image resolution) which is a parameter to the descreening function (the kernel size typically depends on the image resolution). This is typically a small size kernel, e.g. 3×3, 5×5 up to 9×9, depending on the resolution of the original image and possibly extra information about the scanner and the scanned screen. Note: The kernel need not be square, e.g. a rectangular kernel, such as 5×9, may also be used.

Using the smoothed image, determine for each pixel which pixels around it should participate in the final convolution. For the current pixel, consider a window of the size of the kernel, with the current pixel at the center. A threshold T1 is given as a parameter which is used to mark the pixels in the current window. Consider a pixel in the window: If for all color components, the difference between this pixel value to the center pixel value is less than T1 (in absolute value) the pixel is marked with a 1, otherwise it is marked with a 0.

Apply the descreening filter. If the number of pixels marked with a 1 in the window is less than a Factor f of the kernel size (a value of f=⅓ was found to give good results), the original pixel value is restored. Additionally, for a color component for which there is a small change in values within the original (non-smoothed) window (i.e. the difference between the maximal value to the minimal value in this component is less than another threshold T2), restore the value of this color component. If both of these conditions do not hold, compute a new value for each component according to the following formula:

$$new\_value = \sum_{i,j} mark(i, j) \cdot pixel(i, j) \cdot lpf(i, j)$$

where:

mark(i,j)=the mark associated with the pixel at location (i,j) in the current window (0/1: according to whether pixel (i,j) is within the threshold T1 from the center pixel (1) or not (0));

pixel(i,j)=the value of that pixel; and lpf(i,j)=the value of the LPF kernel at the corresponding location.

To enhance performance, both in time and memory, the first two steps above, i.e. the smoothing and marking steps, can be applied only to the intensity component of the image information, with no change to the third step. In addition, descreening is only applied to those pixels that are marked as halftone pixels by a previous halftone detection step.

DETAILED DESCRIPTION OF THE INVENTION

Figure 1:
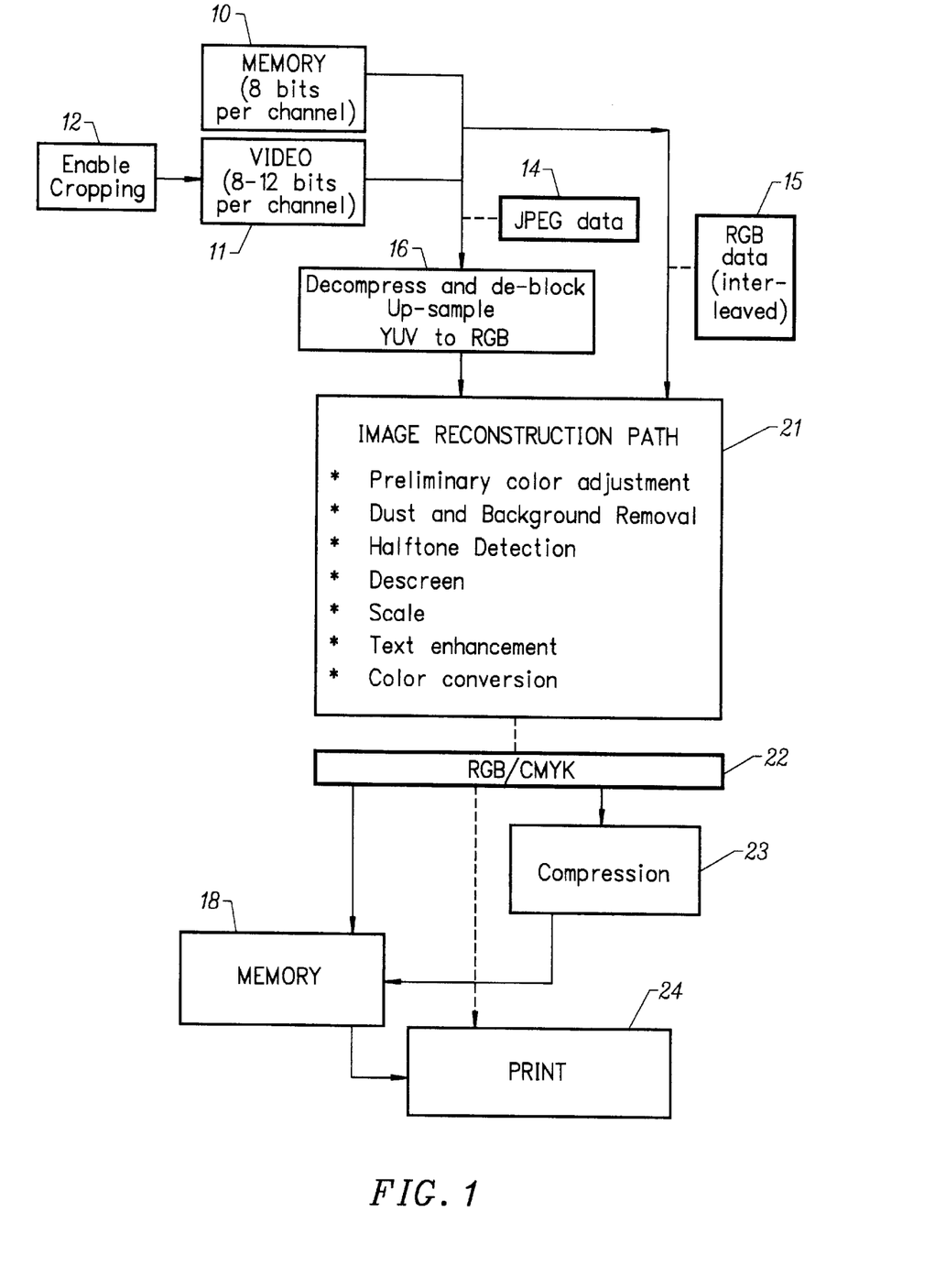
FIG. 1 is a block schematic diagram of an image processing system which includes a descreening module according to the invention.

FIG. 1 is a block schematic diagram of an image processing system which includes a descreening module according to the invention. Image information is provided to the system, either as scanner RGB 15 (e.g. in the case of a digital color copier) or from memory 10. Also, a scanned image may be cropped by a cropping function 12, resulting in a video signal 11. The image information may also include JPEG data.

The image information is decompressed and deblocked, up-sampled, and converted to RGB as necessary 16. The image information is then provided to an image reconstruction path 21 (discussed in greater detail below in connection with FIG. 2).

The processed image in RGB or CMYK 22 may be routed to a print engine 24 and memory 19. Compression 23 is typically applied to reconstructed image information that is to be stored in the memory.

Figure 2:
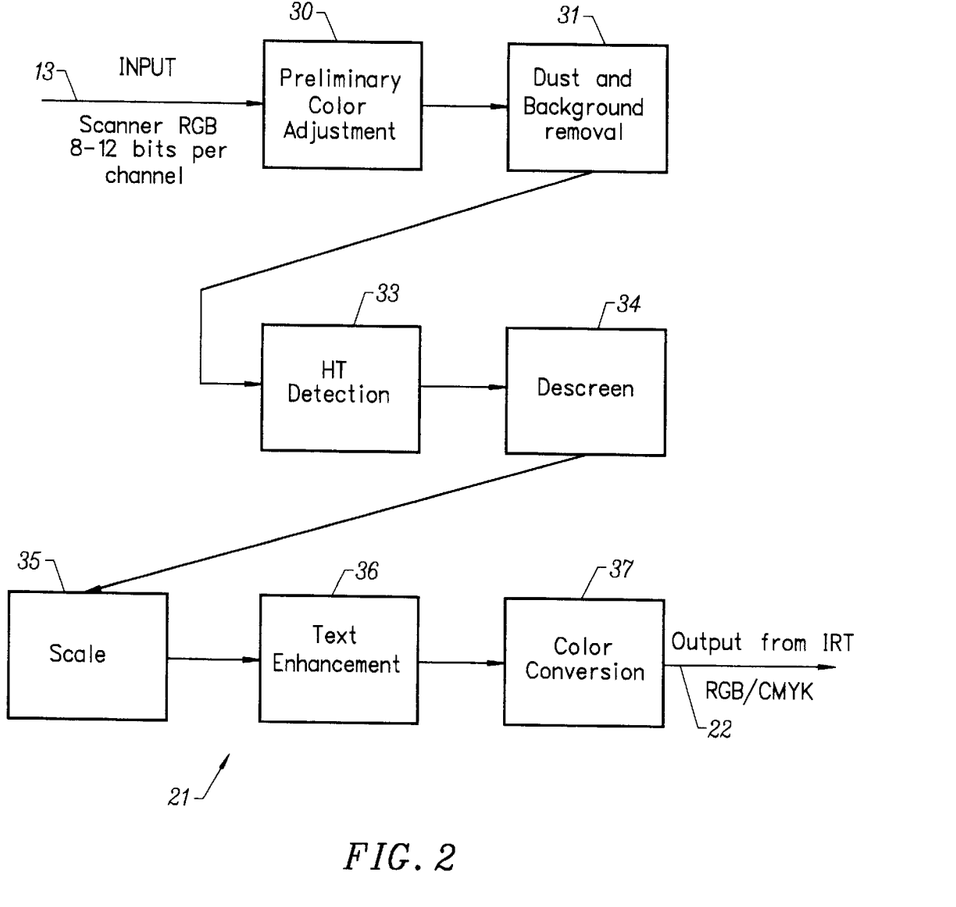
FIG. 2 is a flow diagram of an image reconstruction path which includes a descreening step according to the invention.

FIG. 2 is a flow diagram of an image reconstruction path which includes a descreening step according to the invention. Scanner RGB 13 is typically input to the image reconstruction path 21. The data are first subjected to preliminary color adjustment 30 and dust and background removal 31. Thereafter, halftone detection 33 is performed and the image is descreened 34 (as is discussed in greater detail below). Thereafter, the image is scaled 35, text enhancement is performed 36, and the image data are color converted 37, producing output RGB or CMYK 22 as appropriate for the system print engine.

Figure 3:
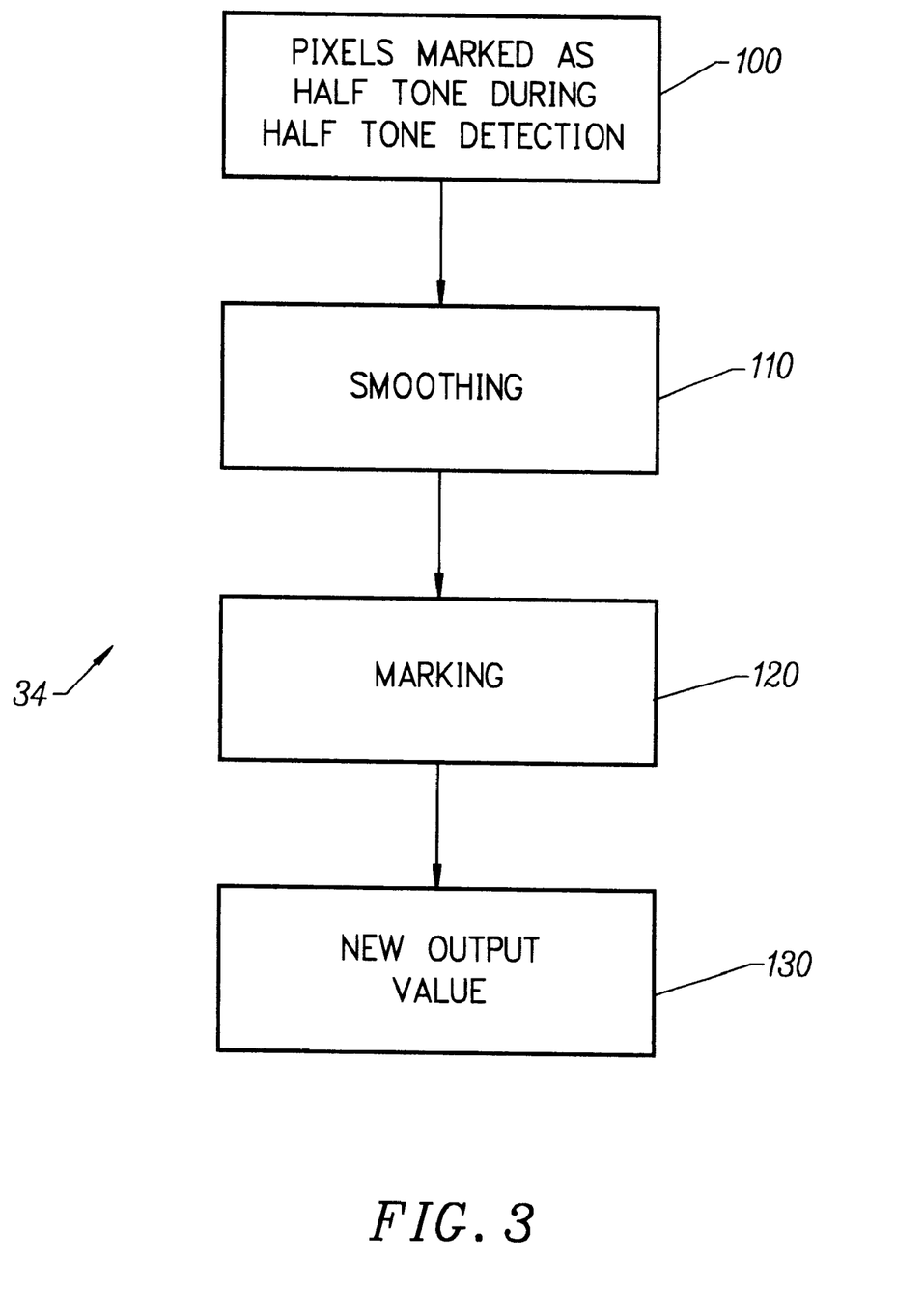
FIG. 3 is a flow diagram showing a descreening technique according to the invention.

FIG. 3 is a flow diagram showing a descreening technique according to the invention.

In the preferred embodiment of the invention, descreening is only applied to those pixels that are marked as halftone pixels by a previous halftone detection step (100).

See, for example, R. Karidi, Method and Apparatus For Image Classification, copending U.S. patent application Ser. No. 09/111,047, filed Jul. 7, 1998. See, also various other schemes as are known for performing halftone detection (for example, T. Hironori, False Halftone Picture Processing Device, Japanese Publication No. JP 60076857 (May 1, 1985); I. Yoshinori, I. Hiroyuki, K. Mitsuru, H. Masayoshi, H. Toshio, U. Yoshiko, Picture Processor, Japanese Publication No. JP 2295358 (Dec. 6, 1990); M. Hiroshi, Method and Device For Examining Mask, Japanese Publication No. JP 8137092 (May 31, 1996); T. Mitsugi, Image Processor, Japanese Publication No. JP 5153393 (Jun. 18, 1993); J.-N. Shiau, B. Farrell, Improved Automatic Image Segmentation, European Patent Application No. 521662 (Jan. 7, 1993); H. Ibaraki, M. Kobayashi, H. Ochi, Halftone Picture Processing Apparatus, European Patent No. 187724 (Sep. 30, 1992); Y. Sakano, Image Area Discriminating Device, European Patent Application NO. 291000 (Nov. 17, 1988); J.-N. Shiau, Automatic Image Segmentation For Color Documents, European Patent Application No. 621725 (Oct. 26, 1994); D. Robinson, Apparatus and Method For Segmenting An Input Image In One of A Plurality of Modes, U.S. Pat. No. 5,339,172 (Aug. 16, 1994); T. Fujisawa, T. Satoh, Digital Image Processing Apparatus For Processing A Variety of Types of Input Image Data, U.S. Pat. No. 5,410,619 (Apr. 25, 1995); R. Kowalski, D. Bloomberg, High Speed Halftone Detection Technique, U.S. Pat. No. 5,193,122 (Mar. 9, 1993); K. Yamada, Image Processing Apparatus For Estimating Halftone Images From Bilevel and Pseudo Halftone Images, U.S. Pat. No. 5,271,095 (Dec. 14, 1993); S. Fox, F. Yeskel, Universal Thresholder/Discriminator, U.S. Pat. No. 4,554,593 (Nov. 19, 1985); H. Ibaraki, M. Kobayashi, H. Ochi, Halftone Picture Processing Apparatus, U.S. Pat. No. 4,722,008 (Jan. 26, 1988); J. Stoffel, Automatic Multimode Continuous Halftone Line Copy Reproduction, U.S. Pat. No. 4,194,221 (Mar. 18, 1980); T. Semasa, Image Processing Apparatus and Method For Multi-Level Image Signal, U.S. Pat. No. 5,361,142 (Nov. 1, 1994); J.-N. Shiau, Automatic Image Segmentation For Color Documents, U.S. Pat. No. 5,341,226 (Aug. 23, 1994); R. Hsieh, Halftone Detection and Delineation, U.S. Pat. No. 4,403,257 (Sep. 6, 1983); J.-N. Shiau, B. Farrell, Automatic Image Segmentation Using Local Area Maximum and Minimum Image Signals, U.S. Pat. No. 5,293,430 (Mar. 8, 1994); and T. Semasa, Image Processing Apparatus and Method For Multi-Level Image Signal, U.S. Pat. No. 5,291,309 (Mar. 1, 1994)).

The presently preferred embodiment of the descreening process herein disclosed comprises three steps:

Smooth the image (110).

Using a smoothed image, determine for each pixel which pixels around it participate in the descreening (120).

Apply the custom filter and output a descreened value for each pixel (130).

Smoothing

Figure 4:
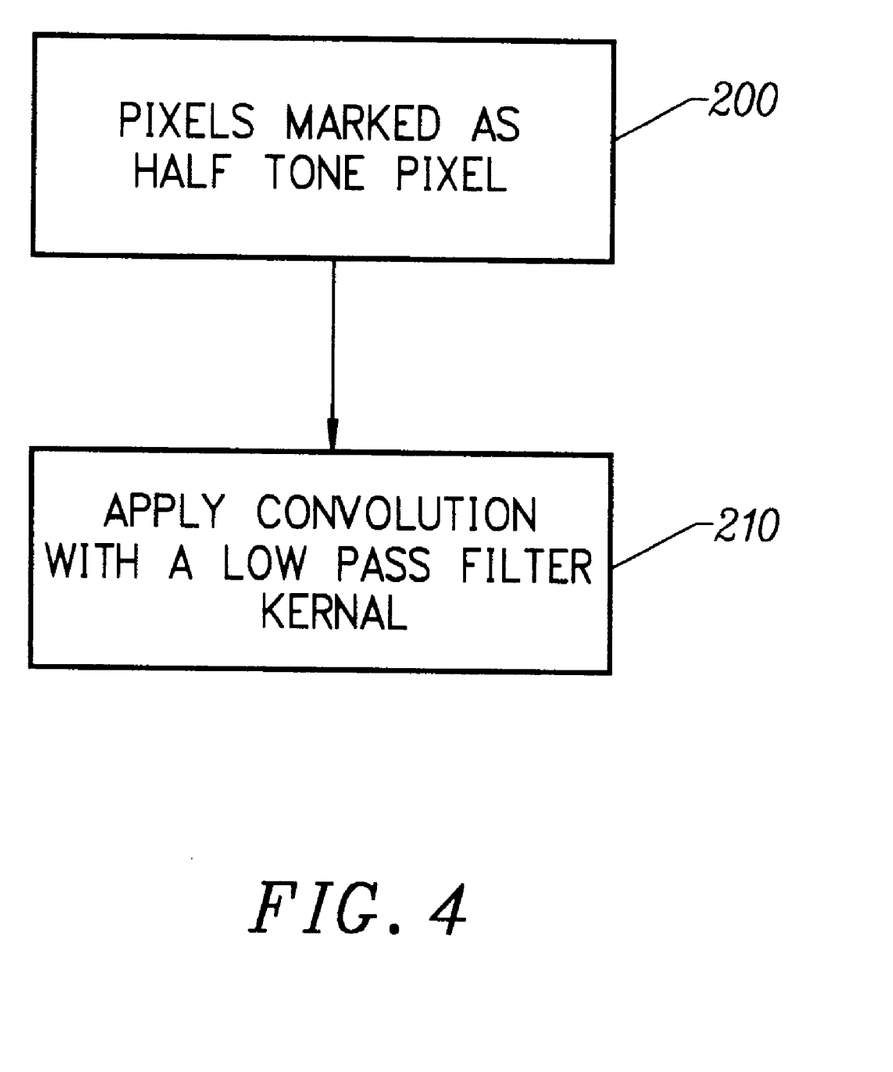
FIG. 4 is a flow diagram showing a smoothing step in the descreening technique according to the invention.

FIG. 4 is a flow diagram showing a smoothing step in the descreening technique according to the invention. As discussed above, the herein disclosed technique is only applied to those pixels that are marked as halftone pixels by application of a previous halftone detection step (200). Smoothing is accomplished by applying a convolution (an example of a kernel is shown below) with an LPF kernel, which is a parameter to the descreening function (210). This is typically a small size kernel, e.g. 3×3, 5×5 up to 9×9, depending on the resolution of the original image and possible extra information about the scanner and the scanned screen. An example of a low pass kernel that may be used in connection with the herein described invention is as follows:

$$\frac{1}{256} \begin{vmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{vmatrix}$$

With regard to low pass filtering in general, see R. C. Gonzalez, R. E. Woods, *Digital Image Processing*, Sections 4.3, 4.4, Addison-Wesley (1992) and R. N. Bracewell, *Two-Dimensional Imaging*, Ch. 8, Prentice-Hall (1995).

Marking

Figure 5:
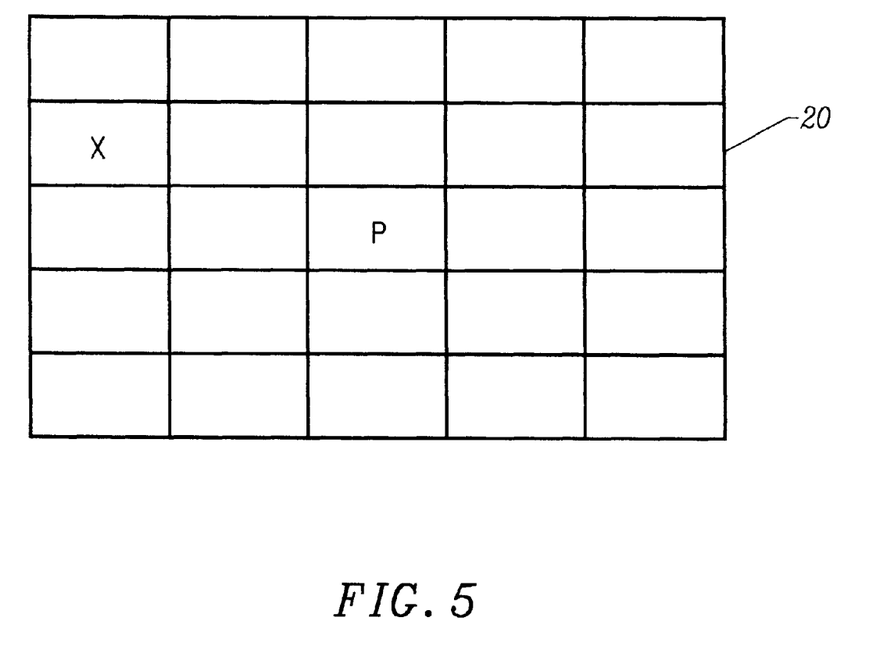
FIG. 5 is a schematic representation of a window used to effect a descreening determination according to the invention.

FIG. 5 is a schematic representation of a window 20 that is used to effect a descreening determination according to the invention. In the window, a center pixel P and a neighbor pixel X are considered.

Figure 6:
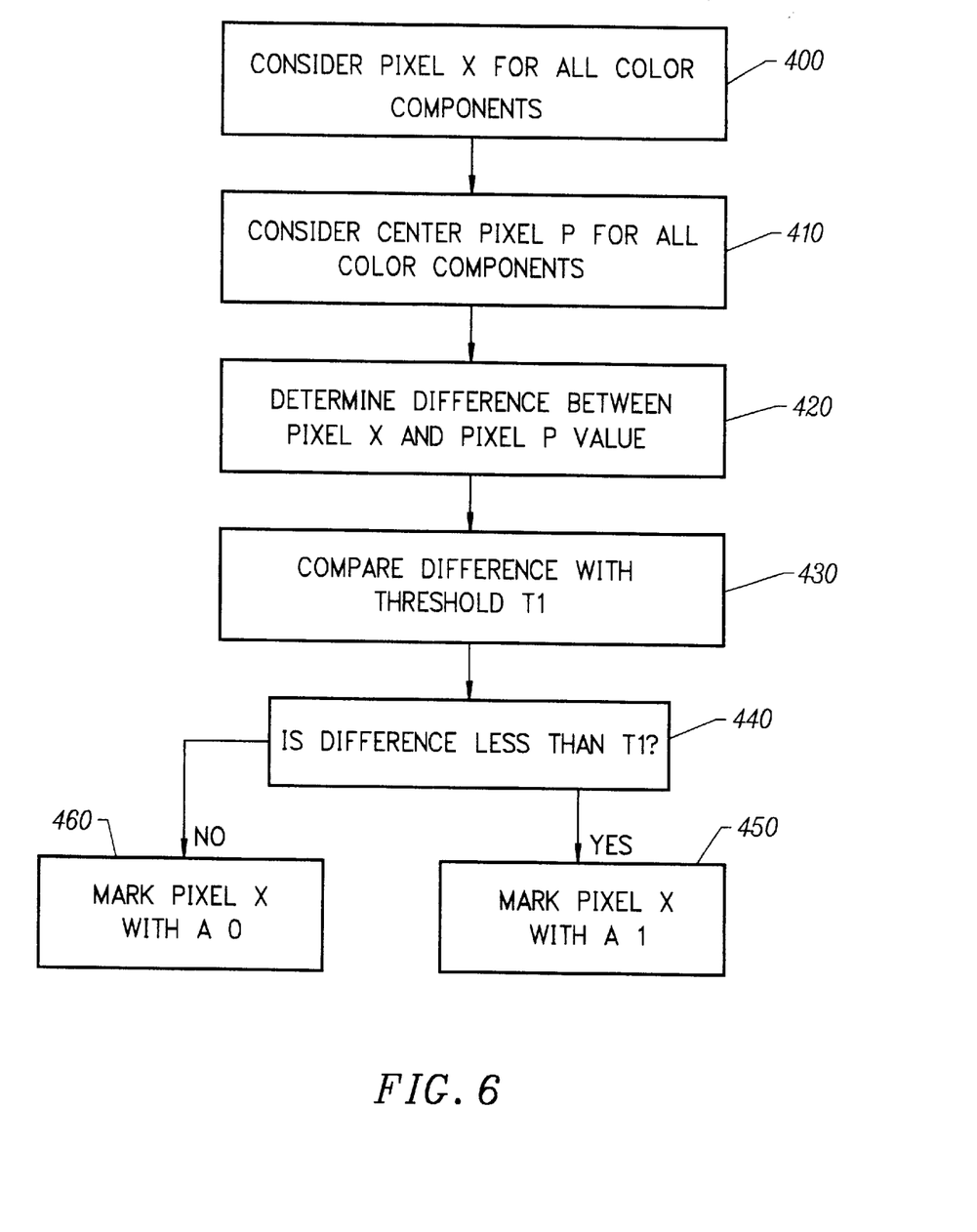
FIG. 6 is a flow diagram showing a marking step in the descreening technique according to the invention.

FIG. 6 is a flow diagram showing a marking step in the descreening technique according to the invention. For the current pixel P, consider a window 20 (FIG. 3) of the size of the LPF, with the current pixel P at the center. A threshold T1 is given to use as a parameter which marks the pixels in the current window. The threshold is set as a fixed parameter to the system configuration and depends on the scanner/printer used and the scanning resolution. The threshold can also be adjusted by the user who may control the descreening level (higher T1 means a more aggressive descreening, i.e. more blurring)

Consider a pixel X in the window (400) and the center pixel P (410). Determine the difference between the pixel X value and the pixel P value (420). Compare the difference with a threshold value T1 (430). If for all color components, the difference between this pixel value to the center pixel value is less than T1 in absolute value (440), the pixel is marked with a 1 (450). Otherwise, the pixel is marked with a 0 (460).

New (output) Value

Figure 7:
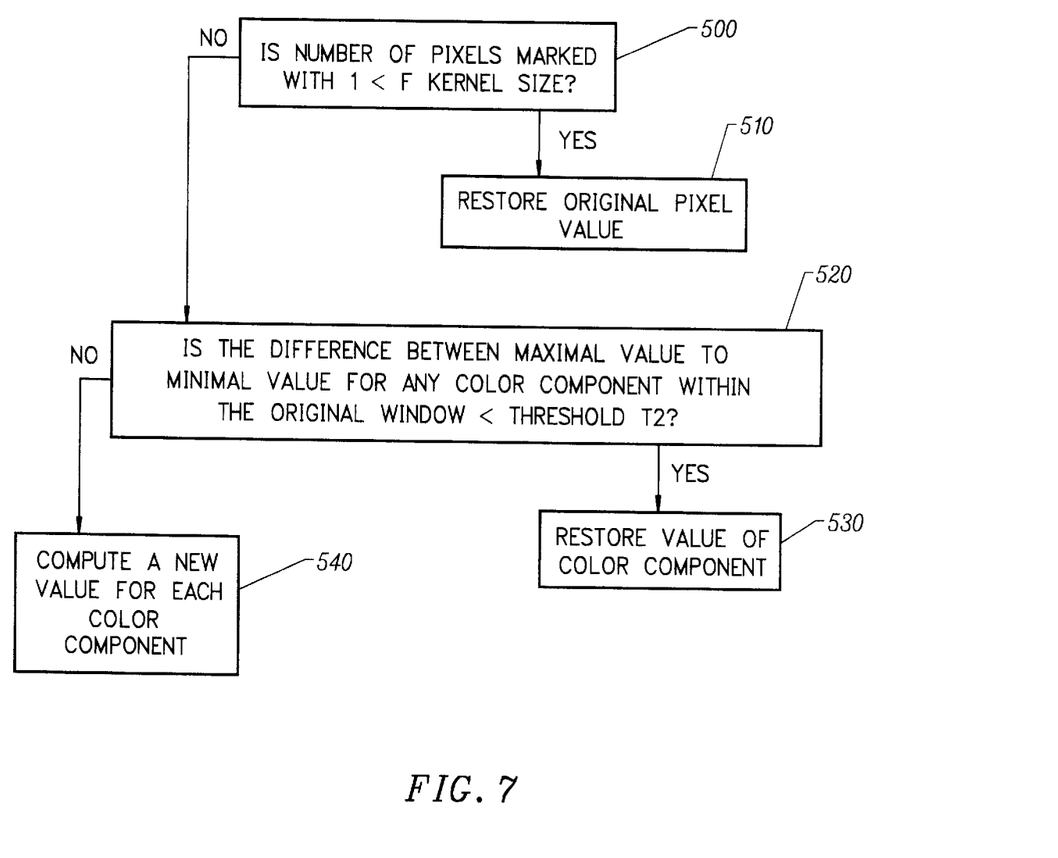
FIG. 7 is a flow diagram showing an output step in the descreening technique according to the invention.

FIG. 7 is a flow diagram showing an output step in the descreening technique according to the invention. If the number of pixels marked with a 1 in the window is less than a factor f of the kernel size (500), the original pixel value is restored (510). While a value for f of ⅓ has been found to work satisfactorily in the preferred embodiment of the invention, it should be appreciated that the invention is not limited to this value.

Additionally, (in the preferred embodiment of the invention) for a color component for which there is a small change in values within the original (non-smoothed) window (i.e. the difference between the maximal value to the minimal value in this component is less than another threshold T2), where T2 is typically 16=¹⁄₁₆ of 256 (520), the value of this color component is restored (530). If these conditions do not hold, the new value for each component is computed (540) according to the following formula:

$$new\_value = \sum_{i,j} mark(i, j) \cdot pixel(i, j) \cdot lpf(i, j) \quad (1)$$

where:
mark(i,j)=the mark associated with the pixel at location (i,j) in the current window
pixel(i,j)=the value of that pixel; and
lpf(i,j)=the value of the LPF kernel at the corresponding location.

In an alternative embodiment of the invention, the value of a color component is restored if the average variation from the mean in the window is less than a predetermined threshold T2.

To enhance performance, both in execution time and memory requirements, the first two steps above, i.e. the smoothing and marking steps, can be applied only to the intensity component, with no change to the third step.

EXAMPLE

Consider the following parameters,
T1=24, T2=16,

| LPF = | | |
|---|---|---|
| 1 | 2 | 1 |
| 2 | 4 | 2 |
| 1 | 2 | 1 |

And consider the following data

| (R) | | | | |
|---|---|---|---|---|
| 240 | 12 | 194 | 197 | 211 |
| 32 | 4 | 176 | 222 | 161 |
| 188 | 185 | 255 | 227 | 59 |
| 78 | 89 | 131 | 151 | 216 |
| 105 | 215 | 68 | 106 | 137 |

| (G) | | | | |
|---|---|---|---|---|
| 119 | 73 | 45 | 39 | 146 |
| 205 | 8 | 136 | 127 | 244 |
| 191 | 141 | 228 | 159 | 215 |
| 40 | 54 | 182 | 33 | 23 |
| 70 | 0 | 106 | 6 | 181 |

| (B) | | | | |
|---|---|---|---|---|
| 240 | 61 | 46 | 81 | 227 |
| 166 | 38 | 174 | 98 | 99 |
| 127 | 37 | 150 | 216 | 151 |
| 244 | 142 | 37 | 251 | 104 |
| 36 | 144 | 64 | 125 | 118 |

After applying the smoothing step, the resulting 3×3 data are:

| (R) | | |
|---|---|---|
| 106 | 167 | 196 |
| 139 | 183 | 185 |
| 137 | 149 | 155 |

| (G) | | |
|---|---|---|
| 108 | 111 | 144 |
| 131 | 148 | 152 |
| 96 | 117 | 100 |

| (B) | | |
|---|---|---|
| 99 | 110 | 132 |
| 105 | 129 | 161 |
| 117 | 118 | 153 |

The data are now ready for the marking step. The only pixels that are marked are those for which the threshold T1 is met for all color components, i.e. the marking matrix is:

| | | |
|---|---|---|
| 0 | 0 | 1 |
| 0 | 1 | 0 |
| 0 | 0 | 0 |

Because only two pixels are marked, the center pixel is left unchanged (255,228,150—from the RGB windows above).

Note that when not applying this condition, the variation within each component is high (251, 244, 215 are all >16), and the new value is (186,147,130).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for descreening a halftone region in an image, comprising:
   smoothing said region in said image;
   marking pixels in said region in said image by using a resulting smoothed image to determine for each pixel in said image which pixels around said pixel participate in convolution;
   applying a low pass filter modified by said marking step; and
   outputting a descreened value for each pixel.

2. The method of claim 1, wherein said descreening method is only applied to those pixels that are marked as halftone pixels by a previous halftone detection step.

3. The method of claim 1, wherein said smoothing step comprises:
applying a convolution with an low pass filter kernel.

4. The method of claim 3, wherein said marking step comprising:
examining a window of the size of said low pass filter, with a current pixel P at the center of said window;
examining a pixel X in said window and said center pixel P;
determining a difference between said pixel X value and said pixel P value;
comparing said difference with a threshold value T1 which is given as an external parameter and is used to mark pixels in said window; and
marking said pixel X is marked with a one if for all color components, said difference between said pixel X value and said center pixel P value is less than T1 in absolute value, otherwise marking said pixel X with a zero.

5. The method of claim 4, wherein said outputting step comprises:
restoring an original pixel value if the number of pixels marked with a one in said window is less than a predetermined percentage of said kernel size.

6. The method of claim 5, wherein said predetermined percentage is one-third.

7. The method of claim 5, further comprising:
restoring the value of a color component if the average variation from the mean in said window is less than a threshold T2.

8. The method of claim 7, further comprising:
computing a new value for each component if the average variation from the mean in said window is equal or greater than a threshold T2.

9. The method of claim 8, wherein said new value is computed according to the formula:

$$new\_value = \sum_{i,j} mark(i, j) \cdot pixel(i, j) \cdot lpf(i, j)$$

where:
mark(i,j)=the mark associated with the pixel at location (i,j) in the current window;
pixel(i,j)=the value of that pixel; and
lpf(i,j)=the value of the low pass filter kernel at the corresponding location.

10. The method of claim 5, further comprising:
restoring the value of a color component if the difference between a maximal value to a minimal value in said window is less than a threshold T2.

11. The method of claim 1, wherein said smoothing and marking steps are applied only to an intensity component of said image.

12. An apparatus for descreening a halftone region in an image, comprising:
means for smoothing said region in said image;
a low-pass-filter (LPF) for determining for each pixel in said region in said image which pixels around said pixel participate in convolution;
means for marking said pixels for descreening;
means for applying said low pass filter modified by said markings; and
means for outputting a descreened value for each pixel.

13. The apparatus of claim 12, wherein said descreening apparatus is only applied to those pixels that are marked as halftone pixels by a previous halftone detection apparatus.

14. The apparatus of claim 12, wherein said smoothing means comprises:
a convolution which is applied with an low pass filter kernel.

15. The apparatus of claim 14, wherein said marking means comprises:
means for examining a window of the size of said low pass filter, with a current pixel P at the center of said window;
means for examining a pixel X in said window and said center pixel P;
means for determining a difference between said pixel X value and said pixel P value;
means for comparing said difference with a threshold value T1 given as an external parameter and which is used to mark said pixels in said window; and
means for marking said pixel X with a one if for all color components, said difference between said pixel X value and said center pixel P value is less than T1 in absolute value, otherwise marking said pixel X with a zero.

16. The apparatus of claim 15, wherein said outputting means comprises:
means for restoring an original pixel value if the number of pixels marked with a one in said window is less than a predetermined percentage of said kernel size.

17. The apparatus of claim 16, wherein said predetermined percentage is one-third.

18. The apparatus of claim 16, further comprising
means for restoring the value of a color component if the average variation from the mean in said window is less than a threshold T2.

19. The apparatus of claim 18, further comprising:
computing a new value for each component if the average variation from the mean in said window is equal to or greater than a threshold T2.

20. The apparatus of claim 19, wherein said new value is computed according to the formula:

$$new\_value = \sum_{i,j} mark(i, j) \cdot pixel(i, j) \cdot lpf(i, j)$$

where:
mark(i,j)=the mark associated with the pixel at location (i,j) in the current window;
pixel(i,j)=the value of that pixel; and
lpf(i,j)=the value of the LPF kernel at the corresponding location.

21. The method of claim 15 is, further comprising:
means for restoring the value of a color component if the difference between a maximal value to a minimal value in said window is less than a threshold T2.

22. The apparatus of claim 12, wherein said smoothing and marking means are applied only to an intensity component of said image.

* * * * *